United States Patent
Dashe

(10) Patent No.: US 9,741,266 B2
(45) Date of Patent: Aug. 22, 2017

(54) MULTI-PANEL DISPLAY DEVICE, BLANK, AND METHOD OF FORMING THE DEVICE

(71) Applicant: ArtSkills, Inc., Bethlehem, PA (US)

(72) Inventor: Stephen P. Dashe, Bethlehem, PA (US)

(73) Assignee: ArtSkills, Inc.

(*) Notice: Subject to any disclaimer, the term of this patent is extended or adjusted under 35 U.S.C. 154(b) by 0 days.

(21) Appl. No.: 15/294,953

(22) Filed: Oct. 17, 2016

(65) Prior Publication Data

US 2017/0032708 A1 Feb. 2, 2017

Related U.S. Application Data

(63) Continuation of application No. 14/754,802, filed on Jun. 30, 2015, now Pat. No. 9,495,886, which is a continuation of application No. 14/614,742, filed on Feb. 5, 2015, now Pat. No. 9,076,352, which is a continuation of application No. 14/573,044, filed on Dec. 17, 2014, which is a continuation of application No. 13/769,706, filed on Feb. 18, 2013, now Pat. No. 8,955,243, which is a continuation-in-part of application No. 29/413,658, filed on Feb. 17, 2012, now Pat. No. Des. 706,872.

(60) Provisional application No. 61/600,152, filed on Feb. 17, 2012.

(51) Int. Cl.
| | |
|---|---|
| G09F 15/00 | (2006.01) |
| G09F 1/06 | (2006.01) |
| B65D 1/22 | (2006.01) |
| G09B 29/04 | (2006.01) |
| G09B 29/00 | (2006.01) |

(52) U.S. Cl.
CPC .............. *G09F 1/06* (2013.01); *B65D 1/22* (2013.01); *G09B 29/001* (2013.01); *G09B 29/04* (2013.01)

(58) Field of Classification Search
CPC ... G09F 1/06; G09F 1/04; G09F 1/065; G09F 1/08; A47F 5/112
See application file for complete search history.

(56) References Cited

U.S. PATENT DOCUMENTS

| | | | |
|---|---|---|---|
| 1,486,695 A | 3/1924 | Singer et al. | |
| 1,958,755 A | 5/1934 | Ihling | |
| 2,240,024 A | 4/1941 | Stone et al. | |
| 2,834,135 A * | 5/1958 | Clarke | A47G 1/141 248/459 |
| 3,469,335 A | 9/1969 | Leigh | |
| 3,481,061 A | 12/1969 | William | |
| D270,358 S | 8/1983 | Errigo | |

(Continued)

FOREIGN PATENT DOCUMENTS

| | | |
|---|---|---|
| JP | 2011104037 | 6/2011 |
| JP | 2013091519 | 5/2013 |

*Primary Examiner* — Cassandra Davis
(74) *Attorney, Agent, or Firm* — Belles Katz, LLC

(57) ABSTRACT

A multi-panel display device, a blank therefor, and a method of forming a multi-panel device for display. The blank may have a center panel; a first side panel attached to the center panel along a first pre-weakened line; a second side panel attached to the center panel along a second pre-weakened line; and a header panel detachably coupled to the second side panel along a third pre-weakened line. The center panel, the first, side panel, and the second side panel may all have the same height. A ratio of the width of the center panel to a width of each of the first and second side panels may be approximately 2:1.

21 Claims, 10 Drawing Sheets

(56) References Cited

U.S. PATENT DOCUMENTS

| | | |
|---|---|---|
| 4,890,652 A | 1/1990 | Hoerner |
| D338,241 S | 8/1993 | Landa |
| 5,388,382 A | 2/1995 | Brooks |
| 5,960,848 A | 10/1999 | Schirer |
| 6,155,325 A | 12/2000 | Schirer |
| 6,272,991 B1 | 8/2001 | Rich et al. |
| 6,382,433 B1 | 5/2002 | Podergois |
| 6,945,398 B2 | 9/2005 | Shumake et al. |
| 7,293,380 B2 | 11/2007 | Repecki |
| 7,434,340 B2 | 10/2008 | Vivro |
| 7,451,800 B2 | 11/2008 | Johnson et al. |
| 7,647,718 B2 | 1/2010 | Burtch |
| 7,739,816 B2 | 6/2010 | Kowatari |
| 7,823,309 B2 | 11/2010 | Albenda |
| 7,886,465 B2 | 2/2011 | Virvo |
| D653,880 S | 2/2012 | Polidoros |
| RE44,673 E | 12/2013 | Albenda |
| D706,872 S | 6/2014 | Dashe |
| 8,955,243 B2 | 2/2015 | Dashe |
| 2003/0205489 A1 | 11/2003 | Shumake et al. |
| 2004/0148833 A1 | 8/2004 | Virvo |
| 2004/0231203 A1 | 11/2004 | Dobelbower et al. |
| 2005/0086842 A1 | 4/2005 | Ternovits et al. |
| 2005/0155259 A1 | 7/2005 | Vivro |
| 2006/0048421 A1 | 3/2006 | Oleksak |
| 2006/0060643 A1 | 3/2006 | Sheffer |
| 2007/0151132 A1 | 7/2007 | Repecki |
| 2008/0178501 A1 | 7/2008 | Crowell et al. |
| 2012/0036746 A1 | 2/2012 | O'Donoghue |

\* cited by examiner

MULTI-PANEL DISPLAY DEVICE, BLANK, AND METHOD OF FORMING THE DEVICE

CROSS-REFERENCE TO RELATED APPLICATIONS

The present application is a continuation of U.S. patent application Ser. No. 14/754,802, filed on Jun. 30, 2015, which is a continuation of U.S. patent application Ser. No. 14/614,742, filed Feb. 5, 2015, now U.S. Pat. No. 9,076,352, which is a continuation of U.S. patent application Ser. No. 14/573,044, filed Dec. 17, 2014, now abandoned, which is a continuation of U.S. patent application Ser. No. 13/769,706, filed Feb. 18, 2013, now U.S. Pat. No. 8,955,243, which: (1) is a continuation-in-part of U.S. Design application Ser. No. 29/413,658, now U.S. Pat. No. D706,872, filed Feb. 17, 2012, and (2) claims the benefit of U.S. Provisional Patent Application Ser. No. 61/600,152, filed Feb. 17, 2012, the entireties of which are hereby incorporated by reference.

FIELD OF THE INVENTION

The present invention relates generally to a multi-panel display device, blank, and method of forming the device, and specifically to a multi-panel display device formed from a blank having an integral header panel.

BACKGROUND OF THE INVENTION

Multi-panel displays are used to display and present a variety of information, such as business information, advertising information and educational information. Furthermore, multi-panel displays are commonly used by students to present information at science fairs and other presentation forums. Recently, header panels have been developed for attaching to the multi-panel displays. These header panels are separate from the multi-panel displays and can be displayed alongside the multi-panel displays or attached to the multi-panel displays. The header panels typically serve as a location on which a user may place a presentation title. However, presenters often forget to use the header panels. Thus, a need exists for a multi-panel display having an integrated header panel. Additionally, typical multi-panel displays are undesirable from a merchandizing and storage perspective because the side panels want to bias into an open position. Furthermore, multi-panel displays have numerous abrupt corners that are often damaged during storage. Thus, a need exists for a multi-panel display that enhances the ability of the multi-panel display to remain in a closed and undamaged position until use is desirable.

SUMMARY OF THE INVENTION

The present invention solves these and other needs by providing a multi-panel display, a blank from which the multi-panel display is formed, and a method of forming the multi-panel display. The blank comprises a center panel, a first side panel attached to the center panel and a second side panel attached to the center panel. A third panel is detachably coupled to the second side panel. The third panel comprises a header panel.

In one aspect, the invention can be a method of assembling a multi-panel device for display, the method comprising: providing a folded blank comprising: a center panel having a first edge, a second edge, and a front surface; a first side panel having a first free edge, a second edge, a top edge, a front surface, and a rear surface, the second edge of the first side panel attached to the first edge of the center panel along a first pre-weakened line; a second side panel having a first edge, a second edge, a top edge, a front surface, and a rear surface, the first edge of the second side panel attached to the second edge of the center panel along a second pre-weakened line; and a header panel having a first edge, a second edge, and a front surface, the first edge of the header panel detachably coupled to the second edge of the second side panel along a third pre-weakened line; the first side panel folded over the center panel about the first pre-weakened line and the second side panel folded over the center panel about the second pre-weakened line; separating the header panel from the second side panel by tearing along the third pre-weakened line; unfolding the folded blank by rotating the first and second side panels relative to the center panel about the first and second pre-weakened lines, respectively, so that the front surfaces of each of the first and second side panels forms an obtuse angle with the front surface of the center panel; and coupling the header panel to the top edge of each of the first and second side panels to form an assembled multi-panel device for display.

In another aspect, the invention can be a blank for a multi-panel display device comprising: a center panel having a first edge, a second edge, a top edge, and a bottom edge, a first height measured between the top and bottom edges of the center panel and a first width measured between the first and second edges of the center panel; a first side panel having a first edge, a second edge, a top edge, and a bottom edge, a second height measured between the top and bottom edges of the first side panel and a second width measured between the first edge and the second edge of the first side panel, the second edge of the first side panel attached to the first edge of the center panel along a first pre-weakened line; a second side panel having a first edge, a second edge, a top edge, and a bottom edge, a third height measured between the top and bottom edges of the second side panel and a third width measured between the first and second edges of the second side panel, the first edge of the second side panel attached to the second edge of the center panel along a second pre-weakened line; and a header panel having a first edge and a second edge, the first edge of the header panel detachably coupled to the second edge of the second side panel along a third pre-weakened line; and wherein each of the first, second, and third heights is the same; and wherein the third width of the second side panel is greater than or equal to the first width of the center panel minus the second width of the first side panel.

In a further aspect, the invention can be a blank for a multi-panel display device comprising: a center panel having a first edge and a second edge, a first width measured between the first and second edges of the center panel, the center panel being devoid of pre-weakened lines between the first and second edges; a first side panel having a first free edge and a second edge, the second edge of the first side panel attached to the first edge of the center panel along a first pre-weakened line, a second width measured between the first free edge and the second edge of the first side panel; a second side panel having a first edge and a second edge, the first edge of the second side panel attached to the second edge of the center panel along a second pre-weakened line, a third width measured between the first and second edges of the second side panel; a header panel having a first edge and a second edge, the first edge of the header panel detachably coupled to the second edge of the second side panel along a third pre-weakened line; and wherein a ratio of the first width to the second width is approximately 2:1.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
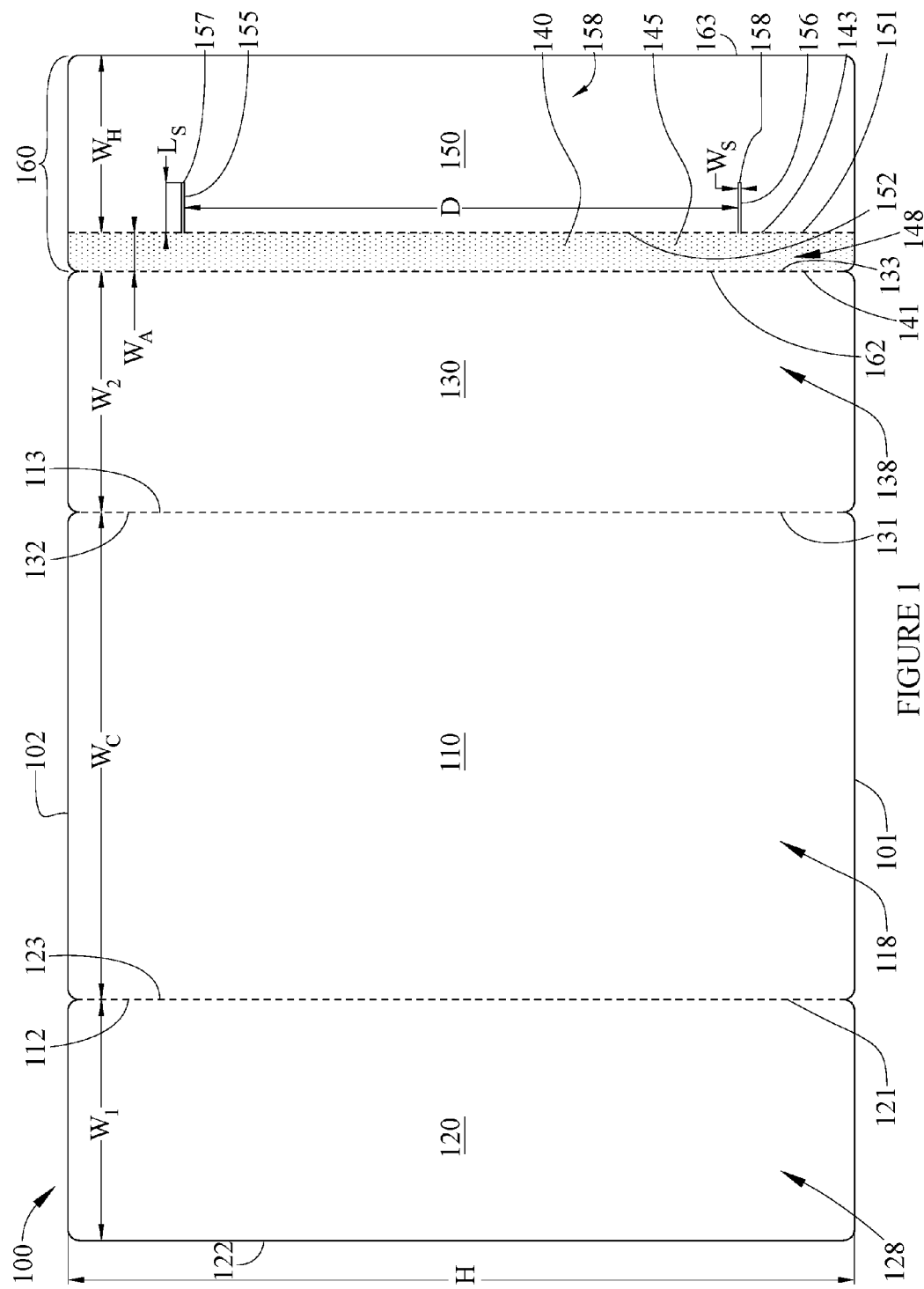
FIG. 1 is a front view of a blank for a multi-panel display according to a first embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, a blank 100 for a multi-panel display is illustrated in accordance with an embodiment of the present invention. The blank 100 generally comprises a center panel 110, a first side panel 120, a second side panel 130 and a third panel 160. The third panel 160 comprises an adhesive panel 140 and a header panel 150. In certain embodiments the blank 100 is formed as a single, integral structure by a die cut technique. Thus, by a single die cut, the entire blank 100 comprising each of the center panel 110, the first side panel 120, the second side panel 130 and the third panel 160 can be integrally formed as a single sheet of material. Of course, the invention is not to be so limited in all embodiments and in other embodiments techniques other than the die cut technique can be used to create the blank 100 as a single integral structure or as a single sheet of material.

As illustrated in FIG. 1, a front surface 118 of the center panel 110, a front surface 128 of the first side panel 120, a front surface 138 of the second side panel 130, a front surface 148 of the adhesive panel 140 and a front surface 158 of the header panel 150 are exposed to view. In the exemplified embodiment, each of the front surfaces 118, 128, 138, 148, 158 are white (or any other color) and they form the display surface of the multi-panel display formed from the blank 100 as discussed below. In the exemplified embodiment, the rear surfaces of the panels 110, 120, 130, 140, 150 (not illustrated in FIG. 1) are not intended to be the display surface and can therefore be any color. For example, in certain embodiments the rear surfaces of the panels 110, 120, 130, 140, 150 are formed of a brown craft paper and the front surfaces 118, 128, 138, 148, 158 of the panels 110, 120, 130, 140, 150 are formed of a white flat linerboard. However, the invention is not to be specifically limited by the colors of the front and rear surfaces of the panels 110, 120, 130, 140, 150 in all embodiments.

In certain embodiments, the blank 100 is formed from a corrugated fiberboard material. For example, the blank 100 may be a double-walled construction including a fluted corrugated sheet and one or two flat linerboards forming the front and rear surfaces. The sizes of the corrugated fiberboard can be a BC-flute, a C-flute, a D-flute, an E-flute or the like. However, the invention is not to be so limited and the blank 100 can be formed from foam, cardboard, heavy-duty paper, binder's board, card stock, display board, paperboard, or the like in other embodiments. The blank 100 is intended to be used as a multi-panel display board, such as a tri-fold display board, for presenting information or school/work projects. Specifically, as discussed in more detail below the blank 100 can be altered into a multi-panel display board and the front surface thereof can be used as a display surface such that a user can write, draw, paint or otherwise create material onto the display surface such as by gluing magazine cutouts thereon or the like. Multi-panel display boards of this type are known to be used in science fairs, for school projects, or other occasions when it is desired to present information to a viewing public.

Each of the first side panel 120, the center panel 110 and the second side panel 130 has four distinct corners. Furthermore, the adhesive panel 140 has two corners and the header panel 150 has two corners. Each of the corners of the first side panel 120, the center panel 110, the second side panel 130, the adhesive panel 140 and the header panel 150 are rounded. Rounding the corners of the panels reduces the likelihood that the corners will become bent or otherwise damaged during storage and/or use of the blank 100 as a multi-panel display. Thus, rounding the corners of each of the panels improves the shelf life of the blank 100 while also adding a superior design aesthetic.

The center panel 110 is positioned between the first side panel 120 and the second side panel 130. Specifically, the center panel 110 has a first edge 112 and a second edge 113, the first side panel 120 has a first free edge 122 and a second edge 123, the second side panel 130 has a first edge 132 and a second edge 133, and the third panel 160 has a first edge 162 and a second free edge 163. In the exemplified embodiment, the first edge 162 of the third panel 160 forms the first edge of the adhesive panel 140, the adhesive panel 140 also having a second edge 143. Furthermore, in the exemplified embodiment the second free edge 163 of the third panel 160 forms a second edge of the header panel 150, the header panel 150 also having a first edge 152.

The first edge 112 of the center panel 110 is attached to the second edge 123 of the first side panel 120 along a first pre-weakened line 121. Similarly, the second edge 113 of the center panel 110 is attached to the first edge 132 of the second side panel 130 along a second pre-weakened line 131. Furthermore, the first edge 162 of the third panel 160 is detachably coupled to the second edge 133 of the second side panel 130 along a third pre-weakened line 141. The second edge 143 of the adhesive panel 140 is detachably coupled to the first edge 152 of the header panel 150 along a fourth pre-weakened line 151. Although the third panel 160 is described herein as being detachably coupled to the second side panel 130 and the header panel 150 is described as being detachably coupled to the adhesive panel 140, each of these panels is formed together on a single sheet during formation of the blank 100. The panels are detached from one another, as will be described in more detail below, when the blank 100 is used to form a multi-panel display device. In the exemplified embodiment, the first, second, third and fourth pre-weakened lines 121, 131, 141, 151 are substantially parallel to one another.

Each of the first and second pre-weakened lines 121, 131 can be a fold line, such as a depression or indentation formed into the front surface of the blank 100 that facilitates folding of the blank 100 about the first and second pre-weakened lines 121, 131. Specifically, the first pre-weakened line 121 facilitates rotating the first side panel 120 relative to the center panel 110 and the second pre-weakened line 131 facilitates rotating the second side panel 130 relative to the center panel 110. Thus, each of the first and second pre-weakened lines 121, 131 can be formed by a pre-folded line or a crease line formed into the blank 100. The techniques for forming the first and second pre-weakened lines 121, 131 are not limiting of the present invention in all embodiments but rather include any pre-formed line in the blank 100 that facilitates folding the blank 100 about the line.

In the embodiment exemplified in FIG. 1, the second side panel 130 is connected to the adhesive panel 140 and the adhesive panel 140 is connected to the header panel 150. Thus, the adhesive panel 140 is positioned in between the second side panel 130 and the header panel 150. The second side panel 130 is connected to the adhesive panel 140 by the third pre-weakened line 141 and the adhesive panel 140 is connected to the header panel 150 by the fourth pre-weakened line 151.

The fourth pre-weakened line 151 is a line formed into the blank 100 that facilitates separating the header panel 150 from the adhesive panel 140 and the third pre-weakened line 141 is a line formed into the blank 100 that facilitates separating the adhesive panel 140 from the second side panel 130. Thus, the third and fourth pre-weakened lines 141, 151 may be referred to herein as perforation lines or score lines that facilitate tearing of the blank 100 along those lines for separation of the two panels on opposing sides of the line. In certain embodiments, the third and fourth pre-weakened lines 141, 151 can be formed by a plurality of small holes that are formed through the blank 100 in a line to facilitate tearing the blank 100 at the location of the third and fourth pre-weakened lines 141, 151. Thus, in certain embodiments the third and fourth pre-weakened lines 141, 151 can be considered perforation lines. Of course, the invention is not to be so limited and the third and fourth pre-weakened lines 141, 151 can be formed by other techniques such as, for example without limitation, a deep depression in the blank 100. The third and fourth pre-weakened lines 141, 151 are configured so that the third panel 160 can be easily broken away or separated from the second side panel 120 and so that the header panel 150 can be easily broken away or separated from the adhesive panel 140.

It should be appreciated that in certain embodiments the first and second pre-weakened lines 121, 131 are different than the third and fourth pre-weakened lines 141, 151 in that the panels on opposing sides of the first and second pre-weakened lines 121, 131 are not easily separated or broken away from each other without using a cutting tool such as scissors, a blade, a knife or the like whereas the panels on opposing sides of the third and fourth pre-weakened lines are easily separated or broken away from each other without the use of a cutting tool. Specifically, the first and second pre-weakened lines 121, 131 are different than the third and fourth pre-weakened lines 141, 151 because if the sheet of material is torn at the first or second pre-weakened lines 121, 131 without using a cutting tool, the tear will be uneven and rugged, whereas tearing at the third or fourth pre-weakened lines 141, 151 creates a smooth, even tear of the sheet of material along that line even without the use of a cutting tool.

In certain embodiments whereby the blank 100 is formed from a corrugated fiberboard, the blank 100 has a thickness of between ⅙ inch and ⅙ inch, and more preferably approximately ⅛ inch. Of course, the invention is not to be so limited and the thickness of the blank 100 may be outside of that range depending on the type of material used to create the blank 100. Furthermore, the blank 100 has a height H extending from a bottom edge 101 of the blank 100 to a top edge 102 of the blank 100 that is between 30-40 inches, and more preferably approximately 35½ inches. Each of the panels has the same height, and thus the height H applies to the blank 100 as a whole or to each panel individually. Of course, heights outside of the above-recited range can be used in certain other embodiments where it is desirable to have a larger or smaller multi-panel display. Thus, the height of the blank 100 is not to be limiting of the present invention unless specifically claimed.

The first side panel 120 has a width $W_1$ extending from the first free edge 122 of the first side panel 120 to the second edge 123 of the first side panel 120. In the exemplified embodiment, the width $W_1$ of the first side panel 120 is between 9-12 inches, more preferably between 10½-11 inches, and still more preferably approximately 10⅞ inches. The center panel 110 has a width $W_C$ extending from the first edge 112 of the center panel 110 to the second edge 113 of the center panel 110. In the exemplified embodiment, the width $W_C$ of the center panel 110 is between 18-24 inches, and more preferably approximately 22 inches. The second side panel 130 has a width $W_2$ extending from the first edge 132 of the second side panel 130 to the second edge 133 of the second side panel 130. In the exemplified embodiment, the width $W_2$ of the second side panel 130 is between 9-12 inches, more preferably between 10½-11 inches, and still more preferably approximately 10⅞ inches. In the exemplified embodiment, the width $W_1$ of the first side panel 120 is substantially equal to the width $W_2$ of the second side panel 130. However, the invention is not to be so limited in all embodiments and the width $W_1$ of the first side panel 120 may be different than the width $W_2$ of the second side panel 130 in certain other embodiments.

The adhesive panel 140 has a width $W_A$ extending from the first edge 162 of the third panel 160 to the second edge 143 of the adhesive panel 140. The width $W_A$ of the adhesive panel 140 is between 1-2 inches, and more preferably approximately 1¾ inches. The header panel 150 has a width $W_H$ extending from the first edge 152 of the header panel 150 to the second free edge 163 of the third panel 160. The width $W_H$ of the header panel 150 is between 6-10 inches, more preferably between 7-9 inches, and still more preferably approximately 8 inches.

Thus, in the exemplified embodiment, the width $W_C$ and height H of the center panel 110 is approximately 22×35½ inches, respectively. However, in other embodiments the width $W_C$ and height H of the center panel 110 can be approximately 22×28 inches, 11×14 inches, or any other desired dimensions. Furthermore, the widths $W_1$, $W_2$, $W_H$, $W_A$ of the first panel 120, the second panel 130, the header panel 150 and the adhesive panel 140 are modified accordingly. Specifically, if the dimensions of the center panel 110 are 11×15 inches, then the widths of the first and second panels 120, 130 will be approximately 5½ inches each, and the combined width of the adhesive panel 140 and the header panel 150 (i.e., the width of the third panel 160) will also be approximately 5½ inches, although the width of the third panel 160 can be smaller if desired. The invention is not to be particularly limited by the dimensions, widths, lengths and heights of the various panels unless specified in the claims.

In the exemplified embodiment, the height H is greater than the width $W_C$ of the center panel 110. Furthermore, in the exemplified embodiment the width $W_2$ of the second side panel 120 is greater than or equal to the width Wc of the center panel 110 minus the width $W_1$ of the first side panel 120 (i.e., $W_2 \geq W_C - W_1$). As will be better understood from the description below, this ensures that the adhesive panel 140 does not contact any portion of the front surface 118 of the center panel 110 when the blank 100 is used to form a multi-panel display in a folded state, and instead the adhesive panel 140 adheres to the rear surface of the first side panel 120 when in the folded state.

Furthermore, similar to the discussion of the height H of the blank 100 above, it should be understood that the widths of the various panels can also be outside of the ranges described herein. The ranges described herein are intended as a description of one preferred embodiment of the present invention. However, it is desirable that as the widths of the various panels change, the ratios between the widths of the various panels remains consistent. For example, in the exemplified embodiment the ratio between the width $W_C$ of the center panel 110 and the width $W_1$ of the first side panel 120 is approximately 2:1. In certain embodiments, this ratio is maintained regardless of the particular widths used. In certain embodiments, the width $W_A$ of the adhesive panel 140 and the width $W_H$ of the header panel 150 can be larger or smaller than that described herein and the ratios of the widths $W_A$ of the adhesive panel 140 and the width $W_H$ of the header panel 150 relative to the first side panel 120, the center panel 110 and the second side panel 130 can also change. Thus, in certain embodiments it is only desirable that the ratio of the widths of the first side panel 120, the second side panel 130 and the center panel 110 remain consistent with that which is disclosed herein and that the equation $W_2 \geq W_C - W_1$ remains satisfied.

The header panel 150 comprises a first slot 155 and a second slot 156. In the exemplified embodiment, each of the first and second slots 155, 156 have the same width and length. Specifically, the first and second slots 155, 156 have a width $W_S$ that is approximately equal to the thickness of the blank 100, if not slightly larger, so as to facilitate detachably coupling the header panel 150 to the multi-panel display formed from the blank 100 as will be described in more detail below. Thus, in certain embodiments the width $W_S$ of the first and second slots 155, 156 is between 1/16 inch and 3/16 inch, and more preferably approximately ⅛ inch.

The first slot 155 has a length $L_S$ measured from the first edge 152 of the header panel 150 to a terminal end 157 of the first slot 155 and the second slot 156 has a length $L_S$ measured from the first edge 152 of the header panel 150 to a terminal end 158 of the second slot 156. The length $L_S$ of the slots 155, 156 is less than the width $W_H$ of the header panel 150. In the exemplified embodiment, the length $L_S$ of the slots 155, 156 is between 25% and 30% of the width $W_H$ of the header panel 150. Thus, the length $L_S$ of the slots 155, 156 is between approximately 1.5-3.0 inches, and more preferably between 2.0-2.4 inches. Furthermore, the first and second slots 155, 156 are spaced from one another along the length of the header panel 150 by a distance D. The distance D between the first and second slots 155, 156 is preferably between 22 and 28 inches, and more preferably approximately 25 inches. The distance D facilitates utilizing the header to display the multi-panel display in a desirable orientation with the left and second side panels 120, 130 at an optimal angle relative to the center panel 110. In certain embodiments, the distance D between the first and second slots 155, 156 is greater than the width $W_C$ of the center panel 110.

The front surface 148 of the adhesive panel 140 is at least partially coated with an adhesive material 145 to facilitate maintaining the blank 100 in a closed state when such is desired, such as during storage or sale of the blank 100. The adhesive material 145 can be any type of glue or other material in a liquid, semi-liquid or even solid state that adheres or bonds items together. Furthermore, the adhesive material 145 may be a double-sided tape, stickers, glue tabs or any other type of tacky substance that is adhered to the adhesive panel 140. In the exemplified embodiment, the adhesive material 145 coats or otherwise covers the entire front surface of the adhesive panel 140. However, the invention is not to be so limited in all embodiments and in certain other embodiments the adhesive material 145 may be sparsely positioned on the adhesive panel 140, such as by putting the adhesive material on the top and bottom of the adhesive panel 140 or around the periphery of the adhesive panel 140. Thus, the adhesive material 145 may either cover the entirety of the front surface 148 of the adhesive panel 140 or portions thereof.

Figure 2:
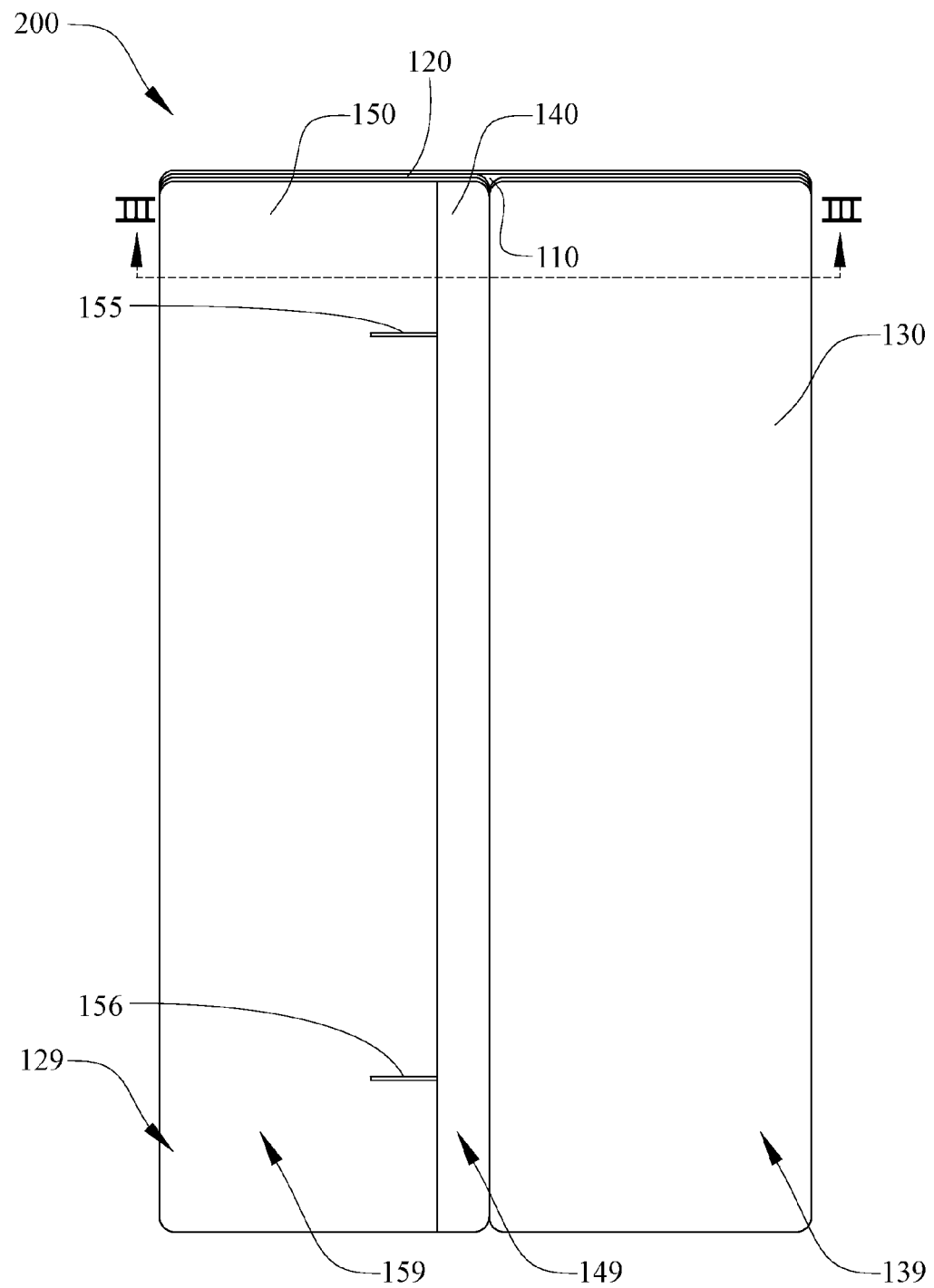
FIG. 2 is a front perspective view a multi-panel display in a folded state, wherein the multi-panel display is formed from the blank of FIG. 1.
Figure 3:
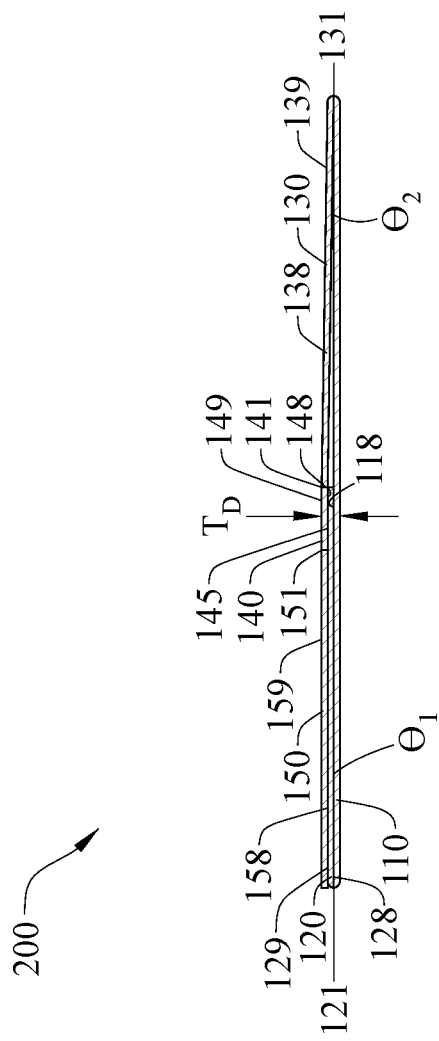
FIG. 3 is a cross-sectional view taken along line III-III of FIG. 2.
Figure 4:
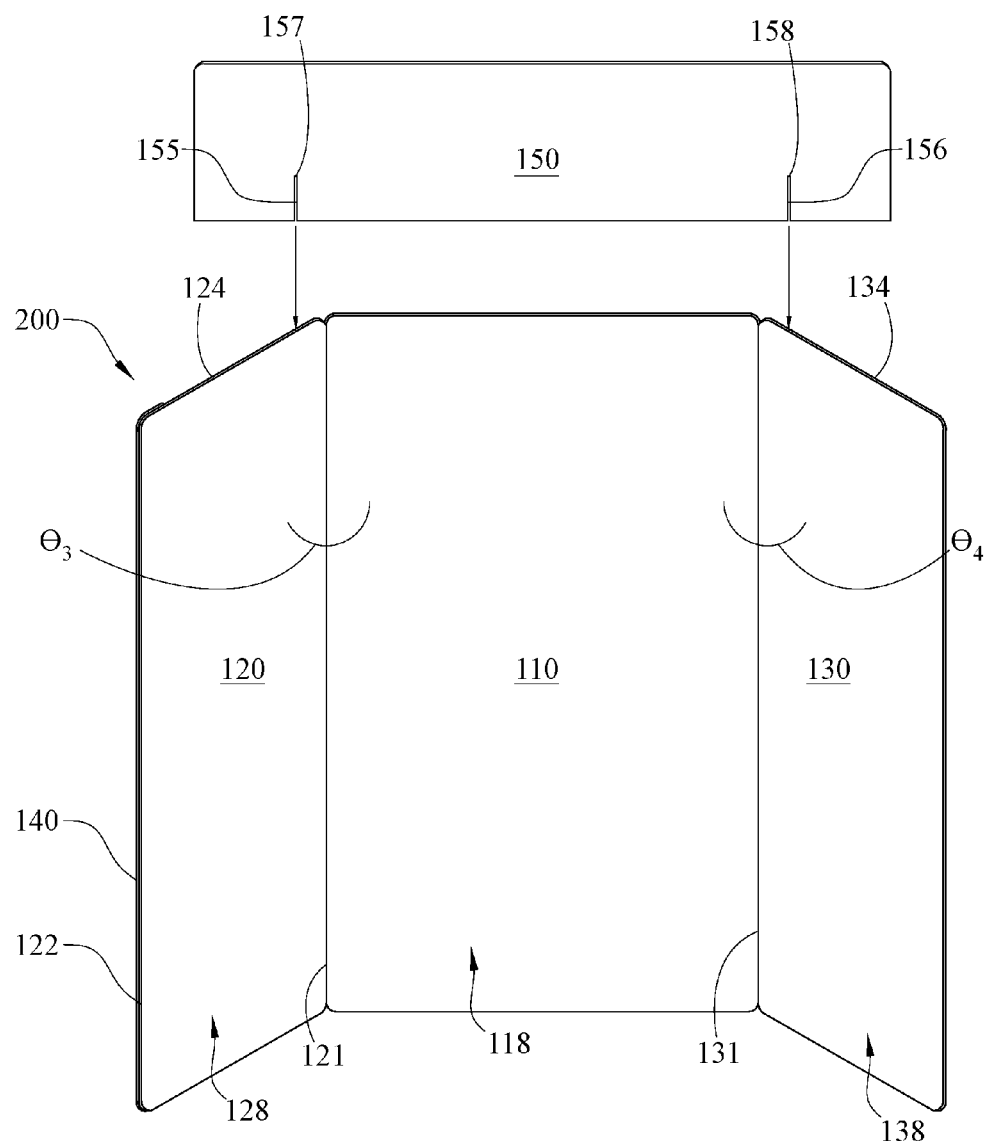
FIG. 4 is a front perspective view of the multi-panel display formed from the blank of FIG. 1, wherein the multi-panel display is in a partially assembled state.
Figure 5:
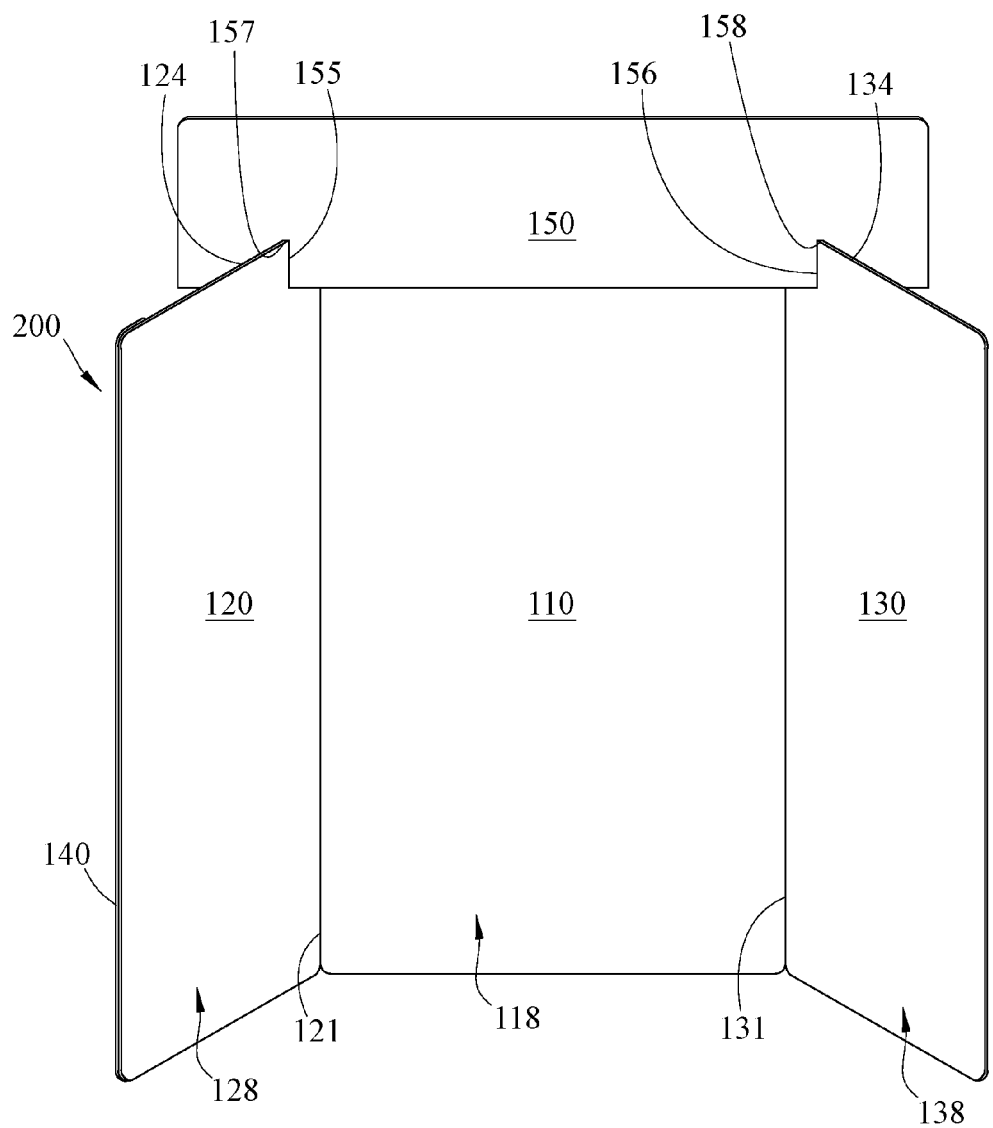
FIG. 5 is a front perspective view of the multi-panel display formed from the blank of FIG. 1, wherein the multi-panel display is in a fully assembled state.
Figure 6:
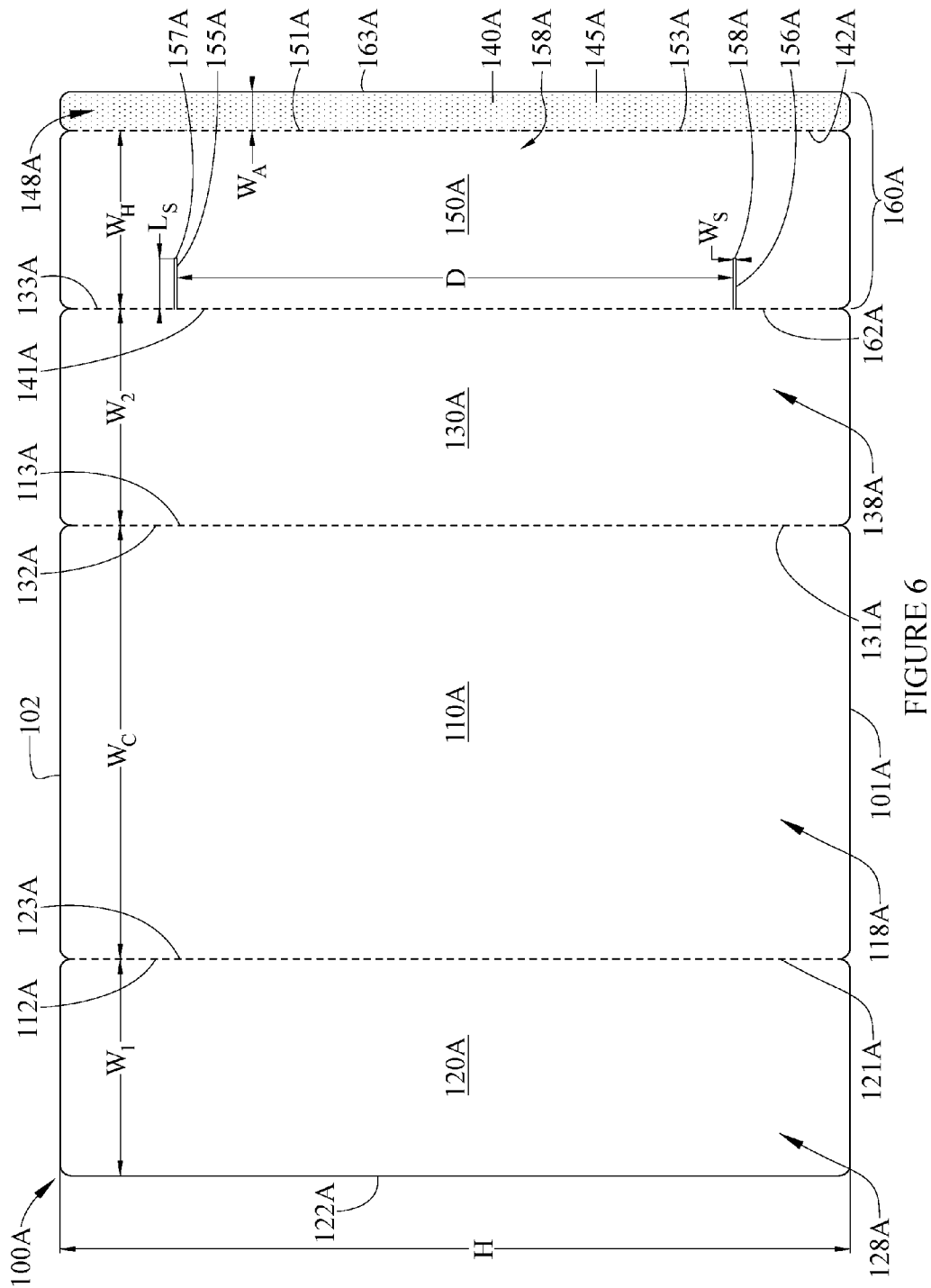
FIG. 6 is a front view of a blank for a multi-panel display according to a second embodiment of the present invention.

Referring now to FIGS. 2 and 3 concurrently, the blank 100 is illustrated as a multi-panel display device 200 in a folded state. As will be better understood from the discussion below, the multi-panel display device 200 is alterable between the folded state as illustrated in FIGS. 2 and 3 and an unfolded state as illustrated in FIGS. 4 and 5. Altering of the multi-panel display device 200 between the folded and unfolded states will be discussed below.

To convert the blank 100 into the multi-panel display 200 in the folded state illustrated in FIGS. 2 and 3, first the first side panel 120 is folded over the center panel 110 about the first pre-weakened line 121. Upon folding the first side panel 120 over the center panel 110 about the first pre-weakened line 121, the front surface 128 of the first side panel 120 lies adjacent to and faces the front surface 118 of the center panel 110. In certain embodiments, the front surface 128 of the first side panel 120 may be in surface contact with the front surface 118 of the center panel 110. Next, the second side panel 130 is folded over the center panel 110 about the second pre-weakened line 131. Upon folding the second side panel 130 over the center panel 110 about the second pre-weakened line 131, the front surface 138 of the second side panel 130 lies adjacent the front surface 118 of the center panel 110. In certain embodiments, the first side panel 120 may extend across the center panel 110 so as to be positioned in between at least a portion of the second side panel 130 and the center panel 110 when the second side panel 130 is folded about the second pre-weakened line 131 as discussed above. However, for purposes of the present invention the second side panel 130 is still considered to be overlying the center panel 110 or folded over the center panel 110.

In the exemplified embodiment, the widths $W_1$, $W_2$ of each of the first and second side panels 120, 130 is equal to approximately one-half of the width $W_C$ of the center panel 110. Thus, upon folding the second side panel 130 over the center panel 110 about the second pre-weakened line 131, the third panel 160 overlies a rear surface 129 of the first side panel 120 so that the adhesive front surface 148 of the adhesive panel 140 adheres the third panel 160 to the rear surface 129 of the first side panel 120. Specifically, the adhesive panel 140 overlaps onto the rear surface 129 of the first side panel 120 so that the front surface 148 of the adhesive panel 140 is in surface contact with the rear surface 129 of the first side panel 120. Due to the adhesive material 145 on the front surface 148 of the adhesive panel 140, the adhesive panel 140 sticks or otherwise adheres to the first side panel 120 and facilitates maintaining the multi-panel display 200 in the folded state.

In certain embodiments it is desirable that the adhesive material 145 on the front surface 148 of the adhesive panel 140 is sufficiently strong or adhesive so that the adhesive panel 140 cannot be separated from the rear surface 129 of the first side panel 120 without tearing the rear surface 129 of the first side panel 120. Furthermore, in other embodiments it is desirable that the adhesive material on the front surface 148 of the adhesive panel 140 is sufficiently strong or adhesive so that upon a user pulling on the header panel 150, the header panel 150 will separate from the adhesive panel 140 by tearing along the fourth pre-weakened line 151 and the adhesive panel 140 will remain adhered to the rear surface 129 of the first side panel 120.

In the folded state, the rear surface 129 of the first side panel 120, a rear surface 159 of the header panel, a rear surface 149 of the adhesive panel 140 and a rear surface 139 of the second side panel 130 are exposed. Thus, in the closed state none of the front surfaces 118, 128, 138, 148, 158 of the center panel 110, the first side panel 120, the second side panel 130, the adhesive panel 140 or the header panel 150 are exposed. As a result, the front surfaces of the panels (i.e., the display surfaces) are protected against damage when the multi-panel display device 200 is in the folded state. Thus, maintaining the multi-panel display device 200 in the folded state utilizing the adhesive panel 140 while on the shelves of a store protects the usable surfaces of the multi-panel display device 200 until their use is desired by a consumer.

When the multi-panel display 200 is in the folded state, the multi-panel display 200 has a combined maximum thickness $T_D$ that equals the thickness of the center panel 110, the third panel 160 and the first side panel 120. Thus, the thickness $T_D$ of the multi-panel display 200 in the folded state is between approximately 3/16 inch and 9/16 inch, and more specifically approximately 3/8 inch.

When in the folded state, the first side panel 120 is oriented at an angle $\Theta_1$ relative to the front surface 118 of the center panel 110 and the second side panel 120 is oriented at an angle $\Theta_2$ relative to the front surface 118 of the center panel 110. In the folded state, each of the angles $\Theta_1$ and $\Theta_2$ are approximately between 0° and 5°.

Referring now to FIGS. 2-4 concurrently, altering or converting the multi-panel display 200 from the folded state to an unfolded state will be described. As discussed above, in certain embodiments it is preferable that the adhesive material 145 is of a sufficient tackiness or adhesiveness such that upon pulling on the second side panel 130 to alter the multi-panel display device into the unfolded state, the adhesive panel 140 remains attached to the rear surface 129 of the first side panel 120 and the header panel 150 separates from the adhesive panel 130 by tearing at the fourth pre-weakened line 151.

Specifically, upon a user pulling on the second side panel 130 in a direction away from the center panel 110, the sheet of material tears at the third pre-weakened line 141 thereby separating or breaking away the adhesive panel 140 from the second side panel 130. As a result, the second side panel 130 will rotate to an open position about the second pre-weakened line 131 while the adhesive panel 140 remains adhesively attached to the rear surface 129 of the first side panel 120. Next, the user can tear the header panel 150 from the adhesive panel 140 along the fourth pre-weakened line 151 to completely detach or break away the header panel 150 from the sheet of material. This configuration is illustrated in FIG. 4 where the adhesive panel 140 remains attached to the rear surface 129 of the first side panel 120 and the header panel 150 is separated from the multi-panel display 200. In this embodiment, the adhesive panel 140 is located adjacent to the first free edge 122 of the first side panel 120. Thus, upon tearing the sheet of material at each of the third and fourth pre-weakened lines 141, 151, the adhesive panel 140 remains attached to the rear surface 129 of the first side panel 120 and the header panel 150 becomes separated from the sheet of material.

Referring to FIGS. 4 and 5, attachment of the header panel 150 to the multi-panel display 200 to create a fully assembled multi-panel display will be described. After the header panel 150 is separated from the remainder of the sheet of material, the first and second side panels 120, 130 are made to extend outwardly from the center panel 110 in a manner oblique to a front surface 118 of the center panel 110. More specifically, the first and second side panels 120, 130 extend from the center panel at an obtuse angle. In the exemplified embodiment, in the unfolded state the first side panel 120 is oriented at an angle $\Theta_3$ relative to the front surface 118 of the center panel 110 and the second side panels 130 is oriented at an angle $\Theta_4$ relative to the front surface 118 of the center panel. Each of the angles $\Theta_3$, $\Theta_4$ is between approximately 90° and 180° relative to the front surface 118 of the center panel 110. This puts the multi-panel display 200 into an orientation such that the front surfaces 118, 128, 138 of each of the center panel 110, the first side panel 120 and the second side panel 130 are simultaneously viewable. Furthermore, the adhesive panel 140 remains attached to the rear surface 129 of the first side panel 120 so that it is out of sight when viewed from the front surfaces such as during a presentation.

After rotating the first and second panels 120, 130 about the first and second pre-weakened lines 121, 131 to position the multi-panel display 200 into the unfolded state, the header panel 150 is mounted to the multi-panel display 200. Specifically, the header panel 150 is mounted to the first and second side panels 120, 130 so as to extend upward from top edges of the first and second side panels 120, 130. More specifically, the first side panel 120 has a top edge 124 and the second side panel 130 has a top edge 134. When the header panel 150 is mounted to the first and second side panels 120, 130, the first slot 155 slidably receives the top edge 124 of the first side panel 120 and the second slot 156 slidably receives the top edge 134 of the second side panel 130. In certain embodiments, the header panel 150 is slid onto the first and second side panels 120, 130 until the terminal end 157 of the first slot 155 is in contact with the top edge 124 of the first side panel 120 and the terminal end 158 of the second slot 156 is in contact with the top edge 134 of the second side panel 130.

The distance D between the first slot 155 and the second slot 156 is configured to ensure that the first and second side panels 120, 130 are oriented at an ideal presentation or display angle relative to the center panel 110 when the header panel 150 is mounted to the first and second side panels 120, 130. In certain embodiments, this angle may be between 15-75°, more preferably between 30-60°, and still more preferably between 40-50°.

Upon mounting the header panel 150 to the first and second side panels 120, 130, the header panel 150 is non-fixedly connected to the first and second side panels 120, 130 such that the header panel 150 can be repetitively separated from and reattached to the first and second side panels 120, 130 as desired. Thus, by using the blank 100 of the present invention the use of a header panel is simplified in that it is integrally formed with and attached to the other panels of the multi-panel display so that purchasing and carrying around a separate header panel is not necessary until after the first use. Furthermore, by utilizing the adhesive panel 140, the multi-panel display of the present invention remains in the closed state until it is desired to open it for use.

FIGS. 6-10 illustrate a second embodiment of a blank 100A and a multi-panel display board 200A in accordance with another embodiment of the present invention. The blank 100A and the multi-panel display board 200A are similar to the blank 100 and the multi-panel display board 200 discussed above with reference to FIGS. 1-5 with the exception that the location of the adhesive panel 140A and the header panel 150A have been swapped. Thus, the discussion with regard to FIGS. 1-5 above is equally applicable to FIGS. 6-10 and a discussion of similar features will not be repeated below in the interest of brevity. Features from FIGS. 6-10 that are similar to features from FIGS. 1-5 will be similarly numbered, except the suffix "A" will be used. Furthermore, the discussions of the various angles, widths, heights, thicknesses and the like made above with regard to FIGS. 1-5 are equally applicable to the embodiment illustrated in FIGS. 6-10.

The blank 100A comprises a center panel 110A, a first side panel 120A, a second side panel 130A and a third panel 160A. The third panel 160A comprises a header panel 150A and an adhesive panel 140A. The positioning and attachments between the first side panel 120A, the second side panel 130A and the center panel 110A along the first and second pre-weakened areas 121A, 131A are the same as that discussed above with regard to FIG. 1. However, in FIG. 6 the third panel 160A has a first edge 162A and a second free edge 163A. The header panel 150A comprises the first edge 162A of the third panel 160A and a second edge 153A. Furthermore, the adhesive panel 140A comprises the second free edge 163A of the third panel 160A and a first edge 142A. The first edge 162A of the third panel 160A (and also of the header panel 150A) is attached to the second edge 133A of the second side panel 130A along a third pre-weakened line 141A. Furthermore, the second edge 153A of the header panel 150A is attached to the first edge 142A of the adhesive panel 140A along a fourth pre-weakened line 151A. The structure and functionality of the first, second, third, and fourth pre-weakened lines 121A, 131A, 141A, 151A is the same as discussed above with regard to FIGS. 1-5. Thus, the main difference between the blank 100A and the blank 100 is that the header panel 150A is adjacent to the second side panel 130A in the blank 100A.

The first side panel 120A has a width $W_1$, the center panel 110A has a width $W_C$, the second side panel 130A has a width $W_2$, the header panel 150A has a width $W_H$ and the adhesive panel 140A has a width $W_A$. The widths of the panels are similar to or the same as that discussed above with regards to FIGS. 1-5. For the blank 100A, it is preferable that the equation $W_2+W_H \geq W_C-W_1$ is met. This ensures that the adhesive panel 140A adheres to the rear surface 129A of the first side panel 120A when the blank 100A is used to form a multi-panel display 200A in a folded state as discussed below.

Furthermore, in the blank 100A all four corners of each of the panels 110A, 120A, 130A, 140A, 150A are rounded corners. Specifically, the attachment lines between the various panels do not extend all the way to the bottom and top edges of each of the panels. Thus, the panels curve into the attachment lines (i.e., into the first, second, third and fourth pre-weakened lines), which creates the rounded corners. Again, this reduces the likelihood that the corners will become bent or otherwise damaged during storage and/or use of the blank 100 as a multi-panel display. Thus, rounding the corners of each of the panels improves the shelf life of the blank 100 while also adding a superior design aesthetic.

The header panel 150A comprises a first slot 155A having a first terminal end 157A and a second slot 156A having a second terminal end 158A. The first and second slots 155A, 156A of the header panel 150A are similar to the first and second slots 155, 156 of the header panel 150 discussed above. Furthermore, the front surface 148A of the adhesive panel 140A is at least partially coated with an adhesive material 145A to facilitate maintaining the blank 100A in a folded or closed state when desired. The adhesive material 145A can be any of the adhesive materials 145 discussed above with regard to the blank 100.

Figure 7:
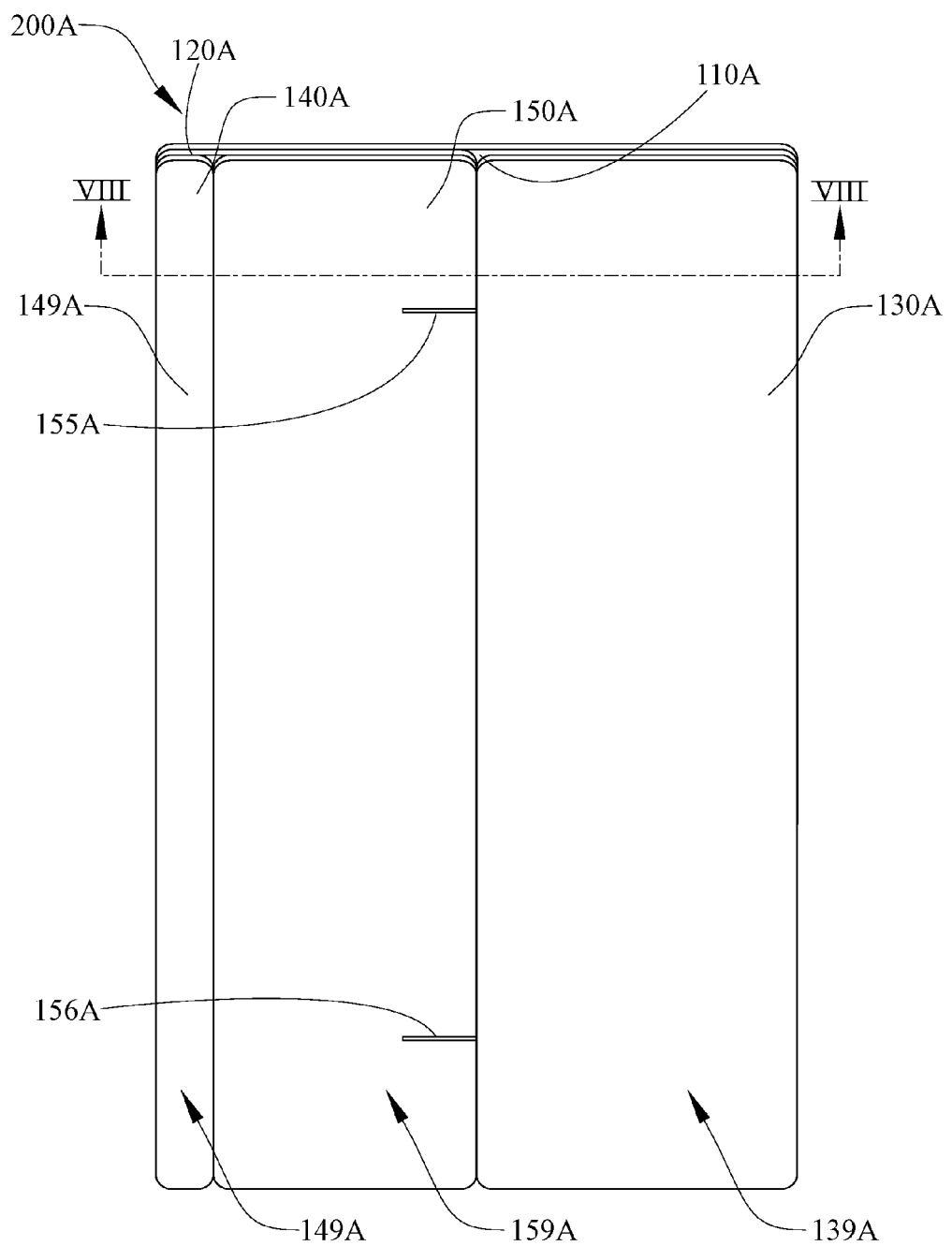
FIG. 7 is a front perspective view a multi-panel display in a folded state, wherein the multi-panel display is formed from the blank of FIG. 6.
Figure 8:
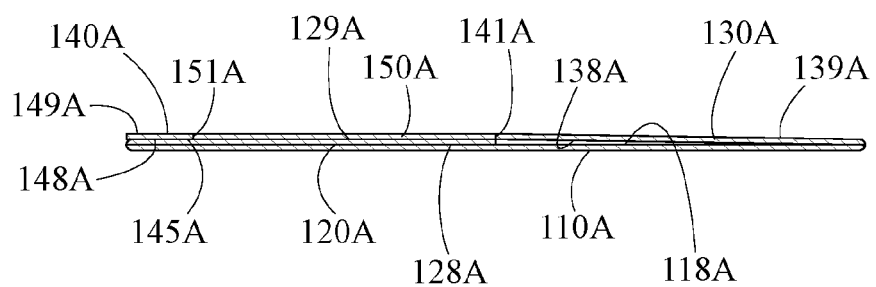
FIG. 8 is a cross-sectional view taken along line VIII-VIII of FIG. 7.

Referring to FIGS. 7 and 8 concurrently, using the blank 100A as a multi-panel display 200A in a folded state will be described. In FIGS. 7 and 8, the blank 100A has been folded to form the multi-panel display 200A in the folded state. Specifically, the first side panel 120A is folded over the center panel 110A about the first pre-weakened line 121A. The second side panel 120A is folded over the center panel 110A about the second pre-weakened line 131A. Upon folding the second side panel 120A over the center panel 110A, the third panel 160A including both the header panel 150A and the adhesive panel 140A overlies a rear surface 129A of the first side panel 120A. More specifically, the front surface 158A of the header panel 150A and the front surface 148A of the adhesive panel 140A overlie and potentially come into contact with the rear surface 129A of the first side panel 120A.

Upon the front surface 148A of the adhesive panel 140A coming into contact with the rear surface 129A of the first side panel 120A, the adhesive panel 140A adheres to the rear surface 129A of the first side panel 120A. Thus, the adhesive panel 140A maintains the multi-panel display 200A in the folded state.

When it is desired to alter the multi-panel display 200A from the folded state into the unfolded state, a user will pull on the second side panel 130A in a direction away from the center panel 110A, which will cause the second side panel 120A to break away or separate from the third panel 160A (i.e., the header panel 150A) along the third pre-weakened line 141A. The second side panel 130A is then rotated out relative to the center panel 110A along the second pre-weakened line 131A to expose the front surfaces 138A, 118A of the center panel 110A and the second side panel 130A. At this point, the header panel 150A remains attached to the adhesive panel 140A along the fourth pre-weakened line 151A and the adhesive panel 140A remains adhered to the rear surface 129A of the first side panel 120A. Thus, next the user will pull on the header panel 150A so as cause the header panel 150A to break away or separate from the adhesive panel 140A along the fourth pre-weakened line 151A. At this point, the header panel 150A is completely separated from the sheet of material, and the first side panel 120A can be rotated out relative to the center panel 110A along the first pre-weakened line 121A. Furthermore, at this point the adhesive panel 140A remains adhered to the rear surface 129A of the first side panel 120A.

Figure 9:
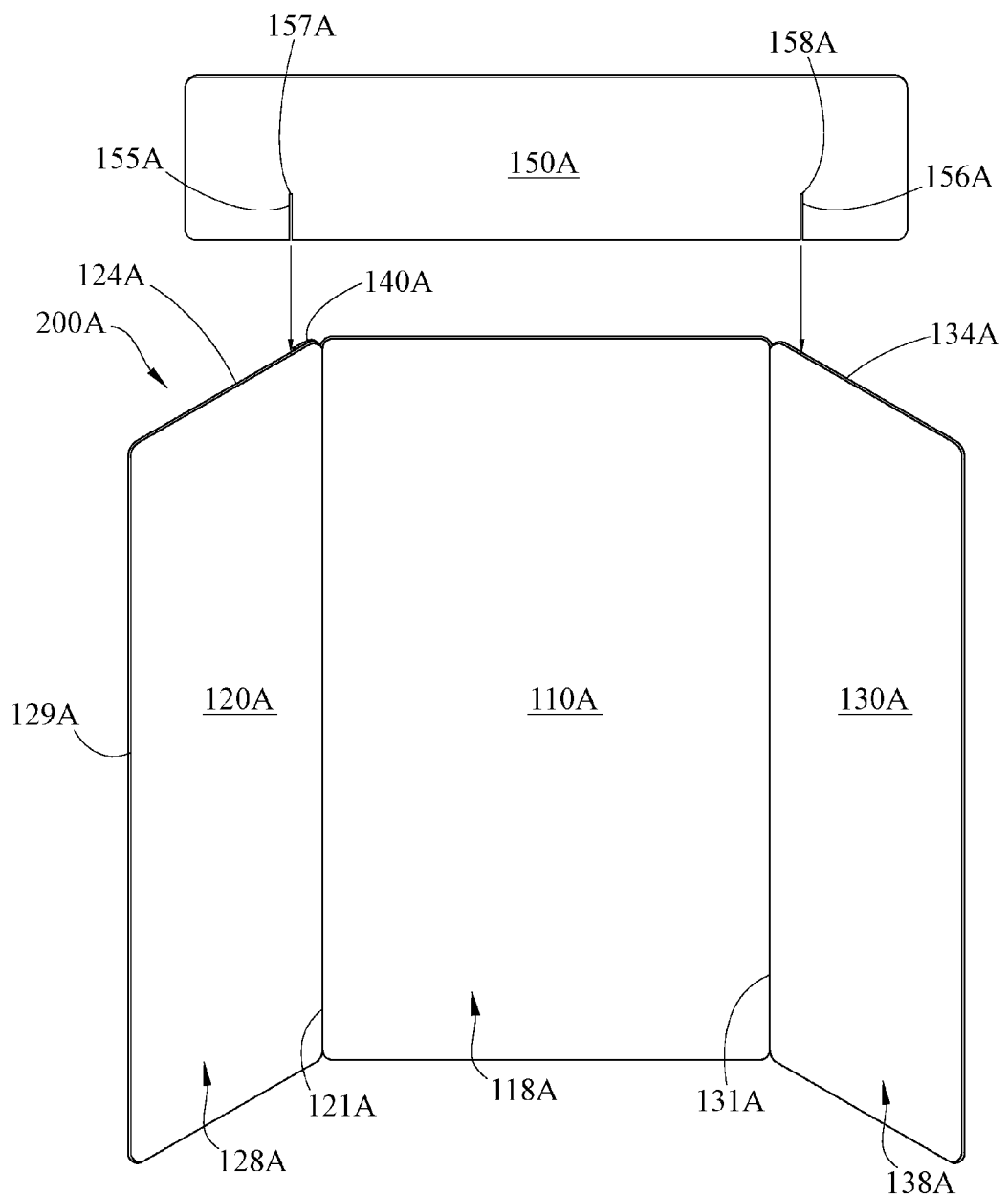
FIG. 9 is a front perspective view of the multi-panel display formed from the blank of FIG. 6, wherein the multi-panel display is in a partially assembled state.

FIG. 9 illustrates the multi-panel display 200A after the header panel 150A has been removed, the first side panel 120A has been rotated along the first pre-weakened line 121A and the second side panel 130A has been rotated along the second pre-weakened line 131A. As can be seen, the adhesive panel 140A remains adhered to the rear surface 129A of the first side panel 120A. In this embodiment, the adhesive panel 140A is adhered to the rear surface 129A of the first side panel 120A at a location adjacent the first pre-weakened line 121A. Of course, the location at which the adhesive panel 140A is adhered to the rear surface 129A of the first side panel 120A can be changed depending on the various widths panels.

Figure 10:
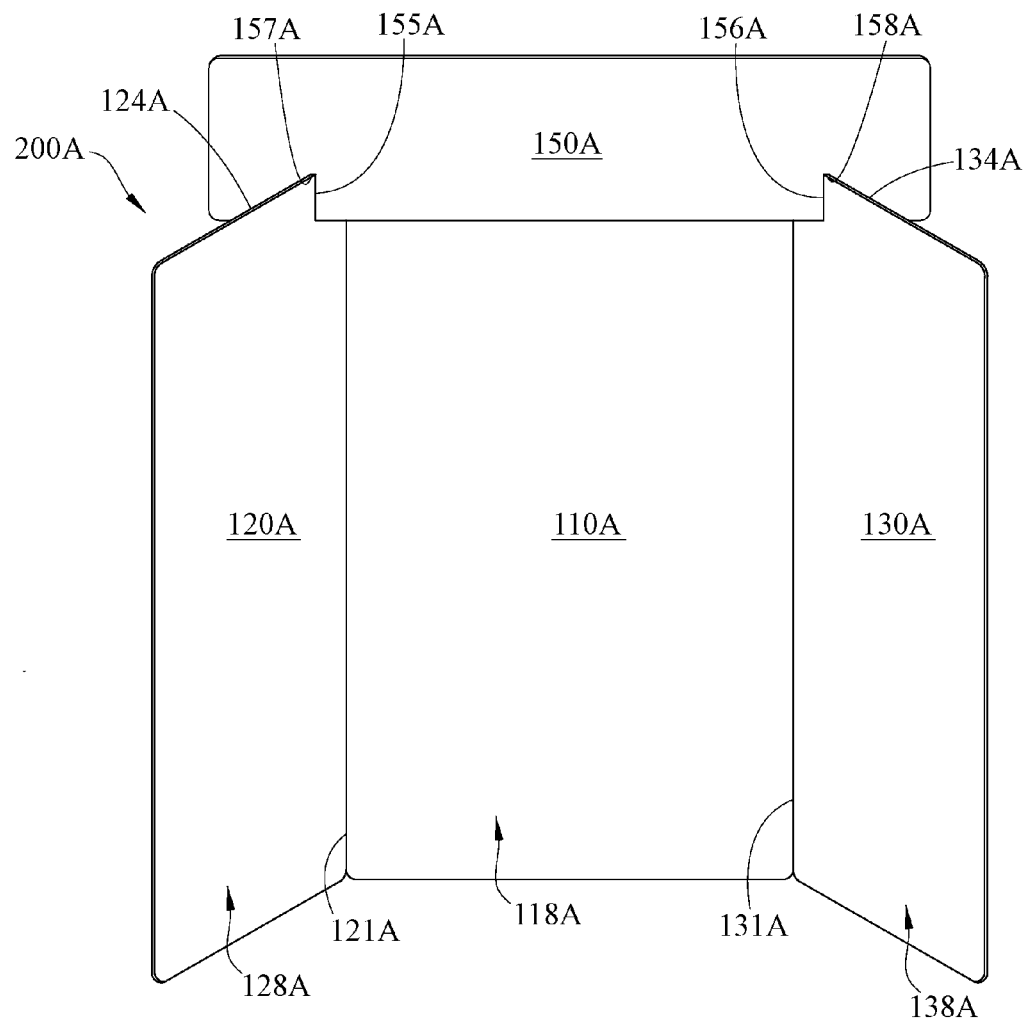
FIG. 10 is a front perspective view of the multi-panel display formed from the blank of FIG. 6, wherein the multi-panel display is in a fully assembled state.

Referring to FIGS. 9 and 10 concurrently, after the multi-panel display device 200A is altered into the unfolded state, the header panel 150A is mounted onto the first and second side panels 120A, 130A in the same manner as discussed above with regard to the multi-panel display device 200. Specifically, the header panel 150A is mounted to the first side panel 120A so that a top edge 124A of the first side panel 120A is received within a first slot 155A in the header panel 150A. The header panel 150A is mounted to the second side panel 130A so that a top edge 134A of the second side panel 130A is received within a second slot 156A in the header panel 150A. The header panel 150A can be slid onto the first and second side panels 120A, 130A until the top edges 124A, 134A of the first and second side panels 120A, 130A come into contact with the terminal ends 157A, 158A of the first and second slots 155A, 156A, respectively. This positioning is illustrated in FIG. 10.

Upon mounting the header panel 150A to the first and second side panels 120A, 130A, the adhesive panel 140A is hidden behind the header panel 150A. Thus, in this embodiment the location of the adhesive panel 140A is such that it is completely blocked from view by being adhered to the rear surface 129A of the first side panel 120A and due to the positioning of the header panel 150A. The header panel 150A can be used to both present a title or other information for the multi-panel display 200A such as during a presentation and can ensure that the first and second side panels 120A, 130A remain oriented at a particularly desired angle relative to the center panel 110A for optimal viewing.

As used throughout, ranges are used as shorthand for describing each and every value that is within the range. Any value within the range can be selected as the terminus of the range. While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of assembling a multi-panel device for display, the method comprising:
   providing a folded blank comprising:
      a center panel having a first edge, a second edge, and a front surface;
      a first side panel having a first free edge, a second edge, a top edge, a front surface, and a rear surface, the second edge of the first side panel attached to the first edge of the center panel along a first pre-weakened line;
      a second side panel having a first edge, a second edge, a top edge, a front surface, and a rear surface, the first edge of the second side panel attached to the second edge of the center panel along a second pre-weakened line; and
      a header panel having a first edge, a second edge, and a front surface, the first edge of the header panel detachably coupled to the second edge of the second side panel along a third pre-weakened line;
      the first side panel folded over the center panel about the first pre-weakened line and the second side panel folded over the center panel about the second pre-weakened line;
   separating the header panel from the second side panel by tearing along the third pre-weakened line;
   unfolding the folded blank by rotating the first and second side panels relative to the center panel about the first and second pre-weakened lines, respectively, so that the front surfaces of each of the first and second side panels forms an obtuse angle with the front surface of the center panel; and
   coupling the header panel to the top edge of each of the first and second side panels to form an assembled multi-panel device for display.

2. The method of claim 1 wherein the folded blank is an integral structure comprising the first and second side panels, the center panel, and the header panel.

3. The method of claim 1 wherein the header panel comprises a first slot and a second slot, each of the first and second slots extending from one of the first and second edges of the header panel towards the other of the first and second edges of the header panel.

4. The method of claim 3 wherein coupling the header panel to the top edge of each of the first and second side panels comprises inserting the top edge of the first side panel into the first slot of the header panel and inserting the top edge of the second side panel into the second slot of the header panel.

5. The method of claim 4 wherein a distance between the first and second slots is greater than a width of the center panel measured between the first and second edges of the center panel.

6. The method of claim 1 wherein the separating the header panel from the second side panel takes place after the unfolding the first and second side panels relative to the center panel.

7. The method of claim 1 wherein in the assembled multi-panel device, the header panel spans the distance between the front surfaces of the first and second side panels and extends beyond the rear surfaces of each of the first and second side panels.

8. The method of claim 1 wherein in the folded blank, bottom edges of each of the center panel, the first side panel, the second side panel, and the header panel lie on a first plane and top edges of each of the center panel, the first side panel, the second side panel, and the header panel lie on a second plane, the first and second planes being parallel, and wherein in the assembled multi-panel device the second plane intersects and is perpendicular to the front surface of the header panel.

9. The method of claim 1 wherein the providing the folded blank further comprises the first side panel being folded over the center panel about the first pre-weakened line so that the front surface of the first side panel faces a first portion of the front surface of the center panel and the second side panel being folded over the center panel about the second pre-weakened line so that the front surface of the second side panel faces a second portion of the front surface of the center panel and the front surface of the header panel faces at least a portion of the rear surface of the first side panel.

10. A blank for a multi-panel display device comprising:
a center panel having a first edge, a second edge, a top edge, and a bottom edge, a first height measured between the top and bottom edges of the center panel and a first width measured between the first and second edges of the center panel;
a first side panel having a first edge, a second edge, a top edge, and a bottom edge, a second height measured between the top and bottom edges of the first side panel and a second width measured between the first edge and the second edge of the first side panel, the second edge of the first side panel attached to the first edge of the center panel along a first pre-weakened line;
a second side panel having a first edge, a second edge, a top edge, and a bottom edge, a third height measured between the top and bottom edges of the second side panel and a third width measured between the first and second edges of the second side panel, the first edge of the second side panel attached to the second edge of the center panel along a second pre-weakened line; and
a header panel having a first edge and a second edge, the first edge of the header panel detachably coupled to the second edge of the second side panel along a third pre-weakened line; and
wherein each of the first, second, and third heights is the same; and
wherein the third width of the second side panel is greater than or equal to the first width of the center panel minus the second width of the first side panel.

11. The blank of claim 10 wherein the center panel is devoid of any pre-weakened lines between the first and second edges thereof.

12. The blank of claim 11 wherein the first side panel is devoid of any pre-weakened lines between the first and second edges thereof, the second side panel is devoid of any pre-weakened lines between the first and second edges thereof, and the third side panel is devoid of any pre-weakened lines between the first and second edges thereof.

13. The blank of claim 10 wherein the second width of the first side panel is substantially equal to the third width of the second side panel.

14. The blank of claim 10 wherein a ratio of the first width of the center panel to each of the second width of the first side panel and the third width of the second side panel is approximately 2:1.

15. The blank of claim 10 wherein the header panel has a fourth height measured between a top edge and a bottom edge thereof, the fourth height being the same as the first, second, and third heights.

16. The blank of claim 10 wherein the top edges of the center panel, the first side panel, and the second side panel lie on a first plane and wherein the bottom edges of the center panel, the first side panel, and the second side panel lie on a second plane, the first and second planes being parallel.

17. The blank of claim 10 wherein in a folded state the first side panel is folded over the center panel about the first pre-weakened line, the second side panel is folded over the center panel about the second pre-weakened line, and the first edge of the first side panel is adjacent to the second edge of the second side panel.

18. The blank of claim 16 wherein in the folded state the first and second side panels do not overlap one another.

19. The blank of claim 10 wherein the first side panel, the second side panel, the center panel, and the header panel collectively form an integral sheet of material.

20. A blank for a multi-panel display device comprising:
a center panel having a first edge and a second edge, a first width measured between the first and second edges of the center panel, the center panel being devoid of pre-weakened lines between the first and second edges;
a first side panel having a first free edge and a second edge, the second edge of the first side panel attached to the first edge of the center panel along a first pre-weakened line, a second width measured between the first free edge and the second edge of the first side panel;
a second side panel having a first edge and a second edge, the first edge of the second side panel attached to the second edge of the center panel along a second pre-weakened line, a third width measured between the first and second edges of the second side panel;
a header panel having a first edge and a second edge, the first edge of the header panel detachably coupled to the second edge of the second side panel along a third pre-weakened line; and
wherein a ratio of the first width to the second width is approximately 2:1.

21. The blank of claim 19 wherein the second and third widths are substantially the same.

* * * * *